United States Patent Office 3,397,212
Patented Aug. 13, 1968

3,397,212
EUCALYPTOL DERIVATIVES
Raymond Valette, Epinay-sur-Seine, France, assignor to Les Laboratoires Albert Rolland, Paris, France, a French society
No Drawing. Filed July 20, 1964, Ser. No. 384,001
Claims priority, application Great Britain, July 18, 1963, 28,499/63
7 Claims. (Cl. 260—345.1)

ABSTRACT OF THE DISCLOSURE

Eucalyptol disulfonic acids of the structure

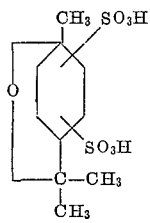

are prepared by sulfonating eucalyptol with $SO_3$ in the presence of dioxane. The new compounds in the form of their free acids or salts are good analeptic and antiseptic agents.

---

This invention relates to eucalyptol derivatives.

The invention provides, as new chemical compounds having the utilities described in detail below, the eucalyptol sulphonic acids and their salts, especially their sodium salts. Eucalyptol disulphonic acid and its sodium salt are the preferred such compounds.

The invention also provides a process for the preparation of the aforesaid new compounds which comprises sulphonating eucalyptol in the presence of dioxane, preferably with a solution of sulphur trioxide in an inert organic solvent, e.g., dichloroethane, at below 0.° C. Surprisingly, this process, unlike conventional sulphanation processes, does not break the oxygen bridge in the eucalyptol molecule.

The new process may conveniently be carried out in one of three ways. In all, the sulphur trioxide is initially in the form of a solution in an inert organic solvent. In the first way, the solution of sulphur trioxide is added slowly to a mixture of dioxane and eucalyptol kept at below 0° C. during the addition. In the second procedure, a dioxane-sulphur trioxide complex is initially prepared from the solution of sulphur trioxide at between 5° and 10° C., and the complex in suspension in the inert solvent is added at below 0° C. to a solution of eucalyptol in an inert solvent. The third method is similar to the second except that the eucalyptol is added to the dioxane-sulphur trioxide complex rather than vice versa. The first procedure, described in Example 1 below, suffers from the disadvantage that the reaction is very exothermic, and the second from the disadvantage that a large proportion of the less valuble mono-sulphonate is produced. The third way of carrying out the reaction, described in Example 2 below, is thus preferred.

The following examples illustrate the process for preparing the new eucalyptol derivatives.

EXAMPLE 1

Oleum containing 60% of sulphur trioxide (150 g.) is heated and the sulphur trioxide (which boils at 46° C.) distilled off into dichloroethane (500 cc.), which is kept stirred, until 73 g. of sulphur trioxide have distilled over (as measured by weighing the residual oleum). No cooling of the dichloroethane is necessary and a pale coloured solution of sulphur trioxide is obtained.

In a 1-litre flask is placed a mixture of eucalyptol (150 g.), dioxane (80 g.), and dichloroethane (200 g.), and the mixture is cooled to −5° C. The solution of sulphur trioxide, prepared as described above, is then added drop by drop, and the flask is cooled to keep the temperature of the mixture below 0° C. for the whole of the period of addition, about 3 hours.

A clear, slightly coloured solution is thus obtained the temperature of which is allowed to rise to 15–20° C., while stirring is continued. After allowing the solution to stand for 24 hours, 200 cc. of cold water are added without the temperature being allowed to rise and the aqueous layer containing the sulphonic acid derivative is separated. This aqueous solution is then neutralized with crystalline barium hydroxide and the precipitated barium sulphate (formed from unreacted sulphur trioxide) is removed by filtration with suction. The filtrate is made strongly alkaline with crystalline sodium carbonate and the precipitated barium carbonate is then filtered off. The filtrate is tested to confirm the absence of barium ions and is then evaporated under reduced pressure. A creamy white precipitate is obtained which is the sodium salt of eucalyptol disulphonic acid.

Analysis: calculated for $C_{10}H_{16}O_7S_2Na_2$, $S=17.88\%$, $Na=12.85\%$; found, $S=18\%$, $Na=12.5\%$. It may be represented by the formula:

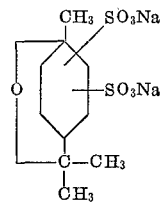

The infra-red spectrum of this compound shows a very strong band at 1050 cm.$^{-1}$, which is characteristic of the oxygen bridge of eucalyptol and thus shows that the method of sulphonation does not destroy this oxygen bridge.

EXAMPLE 2

The dioxane used is initially purified by refluxing for three hours over sodium, distillation, and storage over sodium wire. The dichloroethane is dried over calcium chloride, distilled, and stored over phosphorus pentoxide.

The solution of sulphur trioxide is prepared by distilling about 770 g. of sulphur trioxide into 1000 cc. of dichloroethane kept at about 5–7° C. The temperature of the solution can be allowed to rise to 15° C. without loss of gaseous sulphur trioxide. The strength of the solution is found by weighing the flask from which the sulphur trioxide has been distilled.

The calculated quantity of dioxane (i.e., one molecule for each molecule of sulphur trioxide in the solution; about 750 cc.) and 800 cc. of dichloroethane are placed in a flask equipped with a thermometer, a good stirrer and a cooling system (e.g., an ice-salt freezing mixture). After the mixture has been cooled to 5° C., the solution of sulphur trioxide is introduced, the temperature being kept between 5° and 10° C. A white precipitate soon appears. After completion of the addition, the suspension is allowed to stand at 5°–10° C. for thirty minutes.

The expansion is then cooled to −10° C. and a solution of 500 cc. of eucalyptol in 1000 cc. of dichloroethane is added through a dropping funnel at such a rate that the temperature does not exceed 0° C. Good stirring must be maintained to prevent the mixture separating into two layers. When the addition is complete, the mixture is allowed to warm to room temperature and kept with good stirring for about twelve hours.

A mixture of crushed ice (1 kg.) and water (1 litre) is then added to the reaction mixture which is then stirred for thirty minutes. After separation, the aqueous layer is extracted twice with ether, filtered, and placed in a vessel provided with a stirrer. Dry barium hydroxide is then added until the pH of the mixture is 4.5 (about 1800 g. are required). The precipitated barium sulphate is filtered off. Dry sodium carbonate is then added to the filtrate (containing barium sulphonates) until the mixture is alkaline to phenolphthalein. After testing that all barium has been precipitated, the excess of sodium carbonate is neutralized with 5% aqueous sulphuric acid and the barium carbonate is filtered off. The clear filtrate thus obtained is evaporated to dryness at low temperature and the solid residue is powdered. It consists of a mixture of sodium eucalyptol mono- and di-sulphonates and contains about 85% of the latter. The mono-sulphonate is separated by extraction with boiling absolute ethyl alcohol and hot filtration. After drying the solid residue is the practically pure disulphonate. Further purification is effected by extraction with methylene dichloride in a Soxhlet Extractor to remove traces of absorbed resinous impurities which give the product undesirable odour and bitter taste. The purified product has a soft, slightly soapy taste, which rapidly gives way to a strong sweet taste.

Analysis gives the following results: Sulphur: found, 17.51%; calculated, 17.88%. Sodium: found, 12.72%; calculated, 12.84%.

The alcoholic extract gives, on cooling, crystalline sodium eucalyptol mono-sulphonate, which, after recrystallization from ethyl alcohol, analysis as follows: sulphur: found, 12.79%; calculated, 12.5%. Sodium found, 8.87%; calculated, 8.98%.

The invention includes within its scope pharmaceutical compositions comprising a eucalyptol derivative in accordance with the invention in association with a compatible, pharmaceutically acceptable carrier. The carriers used may be of the kind conventionally used in pharmaceutical compositions and the compositions themselves may be in a form suitable for oral, parenteral, or rectal administration. The eucalyptol derivative will ordinarily be a non-toxic salt in an amount of 0.5 to 95% by weight of the composition.

The effect of the new compounds on the respiration of the rabbit was studied as follows. Male rabbits weighing about 3.5 kg. each are anaesthetised with 10% ethyl carbamate at a dosage of 1 g./kg. A special cannula is introduced into the trachea containing two exits, one of which is connected with a Marey's sphygmograph, which records the amplitude of respiration on a smoked drum. 50 mg./kg. of sodium eucalyptol disulphonate is injected intravenously and a very strong augmentation of the amplitude of respiration is noted, without noticeable change in the frequency of respiration. If the same experiment is repeated using a dose of 60 mg./kg. of sodium camphorsulphonate, a fugitive increase in respiratory amplitude is noticed lasting only one minute. The compounds of the invention thus have a very marked analeptic effect on the respiration.

The antiseptic effect of the new compounds has been compared with that of unsulphonated eucalyptol and potassium sulphoguiacolate. The minimum dose of the compound under test is found which will completely inhibit the growth of typhus bacilli and Staphylococcus 209 P.

The compounds are used in aqueous solution, except eucalyptol which is unsoluble in water and is therefore used as an emulsion containing 1% of sodium ricinoleate to facilitate penetration of the microbial cell wall. (1% sodium ricinoleate solution has no antibacterial activity.)

The dose of sodium eucalyptol disulphonate necessary to inhibit bacterial growth is 0.2 g. in a concentration of 1/5.

The antibacterial effect of the new compounds in aqueous solutions containing 20% of serum on typhus bacilli, Colibacillus 548 P, *Klebsiella pneumoniae*, *Diplococcus pheumoniae* Type I A6, and Staphylococcus 209 P was also determined. Sodium eucalyptol disulphonate in a concentration of 1/10 inhibits *Diplococcus pneumoniae* very quickly, typhus bacilli and *Klebsiella pneumoniae* within two hours, and Colibacillus in an hour.

The antiseptic activity of sodium eucalyptol disulphonate is thus shown to be of the same order as that of eucalyptol, especially if the relative molecular weights of the two compounds are taken into account. This activity is very much greater than that of potassium sulphoguiacolate.

The compounds of the invention, unlike eucalyptol itself, are soluble in water and this is a great advantage in that they can because of this penetrate microbial cell walls more rapidly.

These results have been confirmed using Jouan's biophotometry which makes it possible to follow continuously phenomena of microbial development. The activity of sodium eucalyptol disulphonate against typhus bacilli, Colibacillus, *Klebsiella pneumoniae*, and *Staphylococcus aureus* was shown to be of the same order as that of eucalyptol and much greater than that of potassium sulphoguiacolate.

What I claim is:

1. Eucalyptol mono- and disulfonic acids when prepared by the sulfonation of eucalyptol according to the process of claim 7.
2. The sodium salts of eucalyptol mono- and disulfonic acids of claim 1.
3. Disodium eucalyptol disulphonate.
4. Process for the production of a eucalyptol sulphonic acid which comprises sulphonating eucalyptol in the presence of dioxane.
5. Process according to claim 4 in which the sulphonation is effected with a sulphur trioxide in the presence of an inert organic solvent, and the sulphonation is effected at below 0° C.
6. Process according to claim 5 in which the inert organic solvent is dichloroethane.
7. Process according to claim 6 in which a solution of eucalyptol in dichloroethane is added to a suspension of the dioxane-sulphur trioxide complex in dichloroethane.

References Cited
UNITED STATES PATENTS

| | | | |
|---|---|---|---|
| 1,811,868 | 6/1931 | Skraup et al. | 260—345.1 |
| 2,763,634 | 9/1956 | Teot | 260—686 XR |
| 2,782,230 | 2/1957 | Seaton | 260—686 XR |
| 2,783,273 | 2/1957 | Verley | 260—686 XR |

JOHN D. RANDOLPH, *Primary Examiner.*

J. M. FORD, *Assistant Examiner.*